(12) United States Patent
Vogley

(10) Patent No.: US 6,549,695 B2
(45) Date of Patent: Apr. 15, 2003

(54) METHOD AND APPARATUS FOR OPTICALLY SWITCHING DATA

(75) Inventor: Wilbur Christian Vogley, Cranberry Township, PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/874,726

(22) Filed: Jun. 5, 2001

(65) Prior Publication Data

US 2002/0181850 A1 Dec. 5, 2002

(51) Int. Cl.[7] .............................. G02B 6/35; G02B 6/28; H04J 14/02
(52) U.S. Cl. ............................ 385/18; 385/16; 385/24; 359/128
(58) Field of Search ............................... 385/16, 24, 18; 359/128

(56) References Cited

U.S. PATENT DOCUMENTS

| | | | |
|---|---|---|---|
| 5,377,182 A | | 12/1994 | Monacos |
| 6,289,145 B1 | * | 9/2001 | Solgaard et al. ............... 385/17 |
| 6,317,530 B1 | * | 11/2001 | Ford .......................... 359/212 |
| 6,330,380 B1 | * | 12/2001 | Young et al. ................. 385/17 |
| 6,363,182 B2 | * | 3/2002 | Mills et al. .................. 359/117 |
| 6,385,364 B1 | * | 5/2002 | Abushagur ................... 385/16 |
| 2002/0076137 A1 | * | 6/2002 | Anderson .................... 385/18 |

* cited by examiner

Primary Examiner—John D. Lee
Assistant Examiner—Tina Lin
(74) Attorney, Agent, or Firm—Ansel M. Schwartz

(57) ABSTRACT

A switch for switching data from a source to a destination along a network, at least a portion of which is optically based. The switch a plurality of input and output ports of optical transceivers. The switch an element connected to the input and output ports in which the data is reflected as many times as necessary until a desired output port is available for the data to be sent out to the destination. A method for transferring data in a telecommunications network. The method the steps of receiving data at a chassis of an optical switch in the network. There is the step of reflecting the data in the chassis until an output port of the switch becomes available to the data. There is the step of sending the data out the output port onto the network.

24 Claims, 2 Drawing Sheets

METHOD AND APPARATUS FOR OPTICALLY SWITCHING DATA

FIELD OF THE INVENTION

The present invention is related to optical switches. More specifically, the present invention is related to optical switches in which the data is reflected as many times as necessary until a desired output port is available for the data to be sent out to the destination.

BACKGROUND OF THE INVENTION

Core switches are becoming bigger and bigger with tremendous amounts of cable or fiber interconnects to transfer the data. This creates the need for even more space. The value of the present invention is that it uses air for the transfer medium and delay medium for all traffic. This eliminates the need for cable or fiber inside the physical structure of the switch.

SUMMARY OF THE INVENTION

The present invention pertains to a switch for switching data from a source to a destination along a network, at least a portion of which is optically based. The switch comprises a plurality of input and output ports of optical transceivers. The switch comprises an element connected to the input and output ports in which the data is reflected as many times as necessary until a desired output port is available for the data to be sent out to the destination.

The present invention pertains to a method for transferring data in a telecommunications network. The method comprises the steps of receiving data at a chassis of an optical switch in the network. There is the step of reflecting the data in the chassis until an output port of the switch becomes available to the data. There is the step of sending the data out the output port onto the network.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
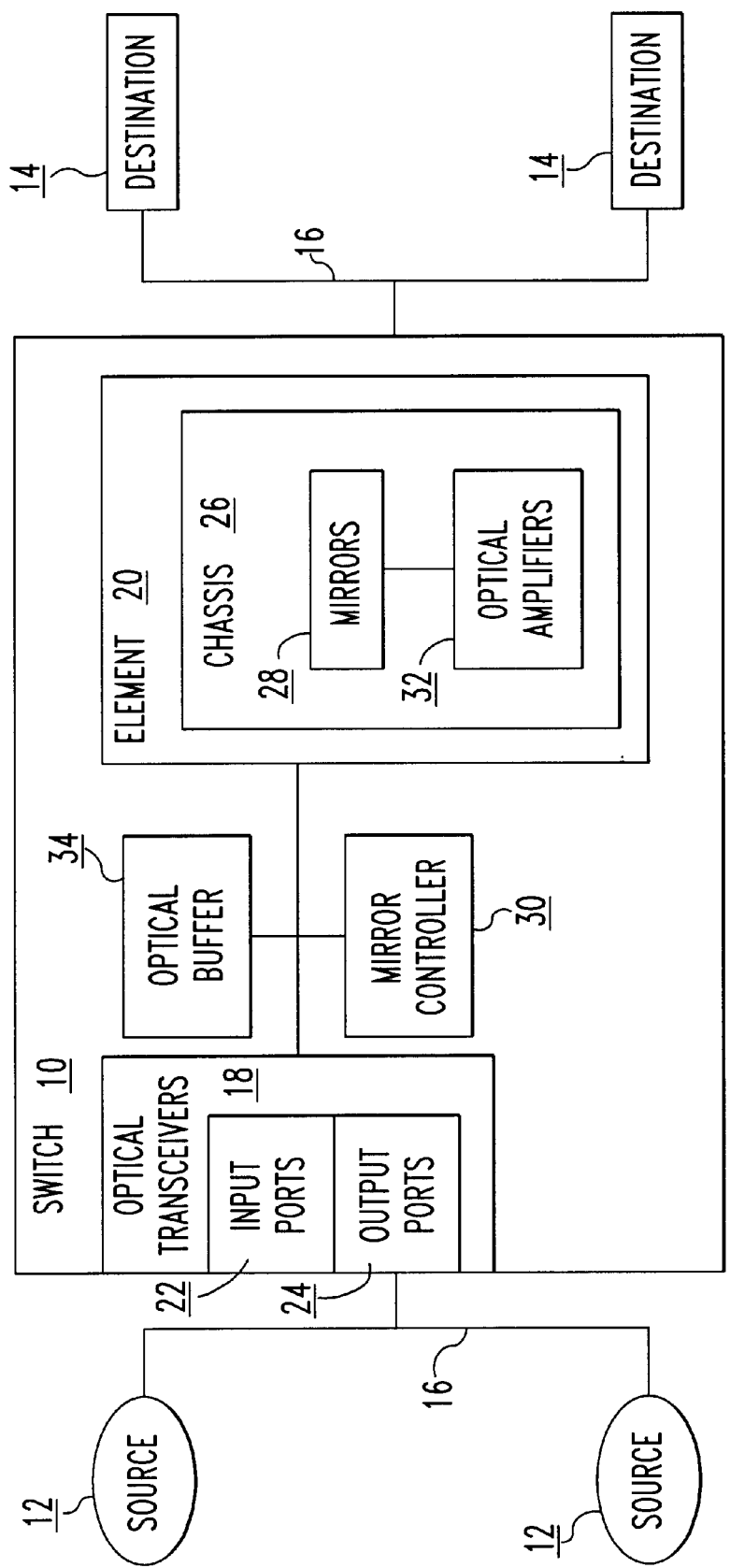
FIG. 1 is a schematic representation of a switch of the present invention.
Figure 2:
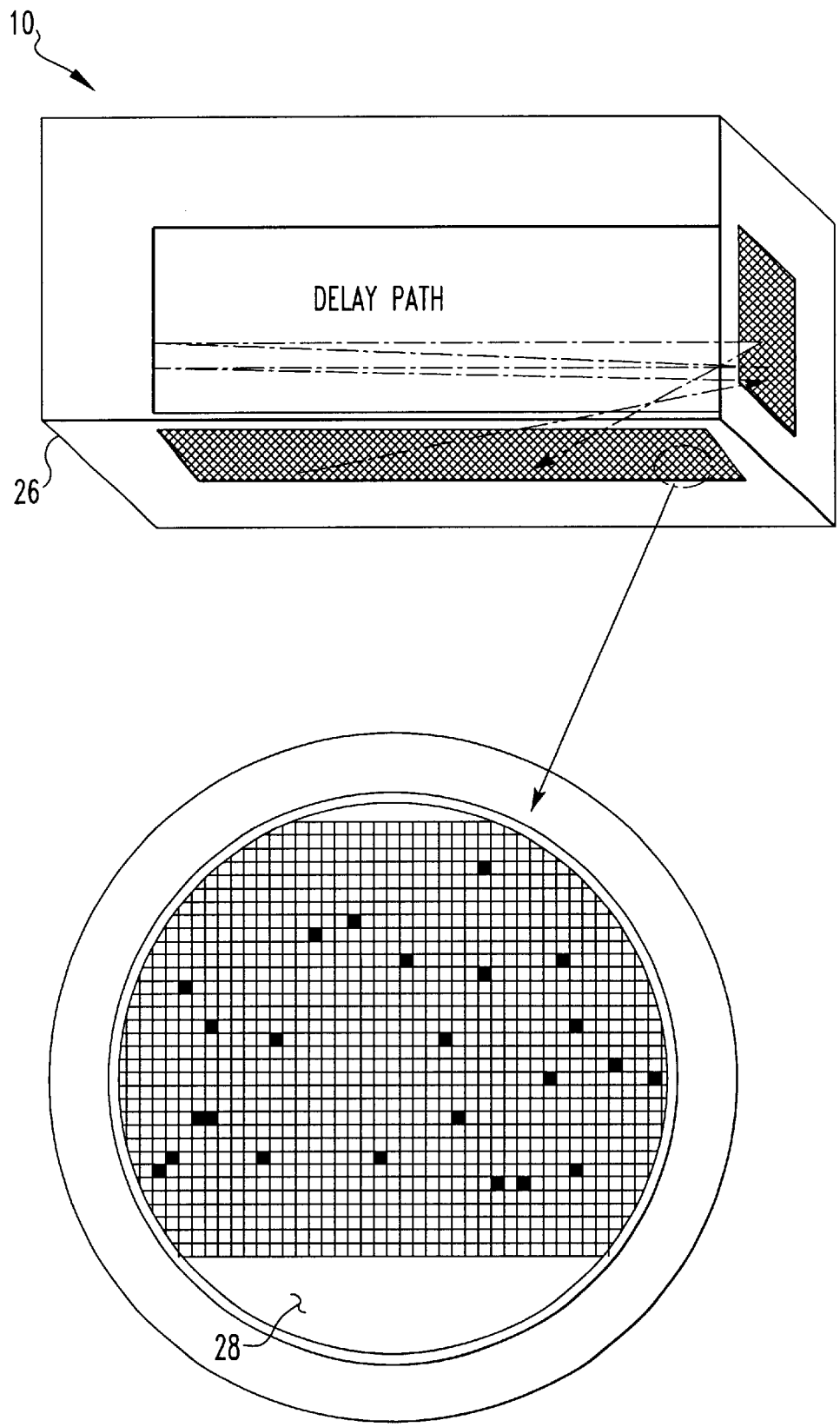
FIG. 2 is a schematic representation of a delay path in the switch of the present invention.

Referring now to the drawings wherein like reference numerals refer to similar or identical parts throughout the several views, and more specifically to FIG. 1 thereof, there is shown a switch 10 for switching data from a source 12 to a destination 14 along a network 16, at least a portion of which is optically based. The switch 10 comprises a plurality of input and output ports 22, 24 of optical transceivers 18. The switch 10 comprises an element 20 connected to the input and output ports 22, 24 in which the data is reflected as many times as necessary until a desired output port 24 is available for the data to be sent out to the destination 14.

In one embodiment, the element 20 stores the data. In a preferred embodiment, the element 20 includes a chassis 26 having a plurality of mirrors 28 that the data reflects off of until the output port 24 becomes available. Each of the mirrors 28 preferably can be oriented into a desired position. Preferably, the switch 10 includes a mirror controller 30 connected to each mirror 28 which orients each mirror 28 to create a desired reflective path for the data so the data is reflected until the output port 24 becomes available.

The mirror controller 30 preferably keeps track of the destination 14 of the data when it is received, and when the output port 24 corresponding to the destination 14 of the data will be available for the data, and determines the desired reflective path for the data from when the data is received and when the output port 24 is available for the data. Preferably, the switch 10 includes optical amplifiers 32, and at least one of the optical amplifiers 32 amplifying the data when the data is received at an input port 22 onto its desired reflective path. The data is preferably refreshed through one of the optical amplifiers 32 after a predetermined number of reflections off of the mirrors 28.

Preferably, the switch 10 includes an optical buffer 34 optically connected to the chassis 26 and the mirror controller 30 which receives the data and delays the data long enough for the mirror controller 30 to identify the destination 14 of the data, establish the desired reflective path for the data in the chassis 26, and then transfer the data to the chassis 26. The mirror controller 30 preferably establishes the desired reflective path from an advance signal about the data which the chassis 26 receives from the network 16.

The present invention pertains to a method for transferring data in a telecommunications network 16. The method comprises the steps of receiving data at a chassis 26 of an optical switch 10 in the network 16. There is the step of reflecting the data in the chassis 26 until an output port 24 of the switch 10 becomes available to the data. There is the step of sending the data out the output port 24 onto the network 16.

Preferably, the reflecting step includes the step of reflecting the data off of mirrors 28 in the chassis 26 until the output port 24 becomes available to the data. The reflecting step preferably includes the step of orienting the mirrors 28 into a desired position with a mirror controller 30 to create a desired reflecting path for the data so the data is reflected until the output port 24 becomes available.

Preferably, the reflecting step includes the step of keeping track with a mirror controller 30 of the destination 14 of the data when it is received, and when the output port 24 corresponding to the destination 14 of the data will be available for the data; and determining the desired reflective path for the data from when the data is received and when the output port 24 is available for the data. The reflecting step preferably includes the step of amplifying the data with an optical amplifier when the data is received onto its desired reflective path.

Preferably, the reflecting step includes the step of refreshing the data through one of the optical amplifiers 32 after the data has a predetermined number of reflections off of the mirrors 28. Before the reflecting step, there are preferably the steps of receiving the data at an optical buffer 34; delaying the data long enough for the mirror controller 30 to identify the destination 14 of the data; establishing the desired reflective path for the data in the chassis 26 based on the destination 14; and transferring the data to the chassis 26. Preferably, before the reflecting step, there is the step of establishing the desired reflective path from an advance signal about the data which the chassis 26 receives from the network 16.

In the operation of the present invention, the switch 10 consists of multiple input/output OC768 and above optical fiber cable transceivers, optical amplifiers 32, box walls of silicon deflective mirrors developed by Texas Instruments and obtainable from them, microprocessor(s), optical taps. See U.S. Pat. No. 5,212,582 titled "Electrostatically Controlled Beam Steering Device and Method", incorporated by reference herein.

Data coming in to the transceiver is amplified while the header information is tapped and decoded to determine route as is well known in the art in regard to electrically represented data. See U.S. Pat. No. 5,377,182 titled "Non-Blocking Crossbar Permutation Engine with Constant Routing Latency", incorporated by reference herein. These same route determination techniques are applied to the chassis 26 to form the desired path for the data through the switch 10. The data is introduced into an optical buffer 34 that delays the data for a period long enough for the necessary mirrors 28 of the chassis 26 to be oriented to form the desired associated path for the data. Alternatively, an advance signal which carries the destination 14 and route information for the data is received at the chassis 26 prior to the time the data is received. From the advance signal information, the necessary mirrors 28 are oriented to form the desired associated path for the data, without the need of an optical buffer 34 to delay the data for mirrors 28 to be properly oriented.

The amplifier is focused on a mirror 28 or mirrors 28 on the inside of the chassis 26. Multiple paths for the data add redundancy. The data is then directed to another mirror 28 or out depending on the state of the destination 14. If the destination 14 is busy, the data will be reflected back and forth or up and down through the hollow chassis 26 until the destination 14 frees up. If the route is more than 10 inter reflective transfers, it is refreshed through an optical amplifier. The chassis 26 can also serve as a storage element 20 for the data by increasing the number of reflections of the data for a desired time to hold or store the data.

The invention is embodied in a Multiple N.to.Multiple N switch for routing packets from N input port(s) to N output port (s), each packet having a header identifying one or more of the output ports as its destination, that may include a plurality of "inline" optical delay of controlled variability, each path possibly having multiple inputs and/or multiple outputs, a plurality of individual controller devices governing path and delay of any given port being recognized by sensing from a header of a packet at each port input the identity of the destination output port of the packet and selecting one of the exchange and bypass states in accordance with the identity of the destination output port and in accordance with control as to relative port busy and time of busy for definition of path.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A switch for switching data from a source to a destination along a network, at least a portion of which is optically based, comprising:

a plurality of input and output ports of optical transceivers;

an element connected to the input and output ports in which the data is reflected as many times as necessary until a desired output port is available for the data to be sent out to the destination, the element includes a chassis having a plurality of mirrors that the data reflects off of until the output port becomes available, each of the mirrors can be oriented into a desired position; and a mirror controller connected to each mirror which orients each mirror to create a desired reflective path for the data so the data is reflected until the output port becomes available, the mirror controller keeps track of the destination of the data when it is received, and when the output port corresponding to the destination of the data will be available for the data, and determines the desired reflective path for the data from when the data is received and when the output port is available for the data.

2. A switch as described in claim 1 including optical amplifiers, and at least one of the optical amplifiers amplifying the data when the data is received at an input port onto its desired reflective path.

3. A switch as described in claim 2 wherein the data is refreshed through one of the optical amplifiers after a predetermined number of reflections off of the mirrors.

4. A switch as described in claim 3 including an optical buffer optically connected to the chassis and the mirror controller which receives the data and delays the data long enough for the mirror controller to identify the destination of the data, establish the desired reflective path for the data in the chassis, and then transfer the data to the chassis.

5. A switch as described in claim 3 wherein the mirror controller establishes the desired reflective path from an advance signal about the data which the chassis receives from the network.

6. A switch as described in claim 1 wherein the element stores the data.

7. A method for transferring data in a telecommunications network comprising the steps of:

receiving data at a chassis of an optical switch in the network;

determining a desired reflective path for the data from when the data is received and when the output port is available for the data;

keeping track with a mirror controller of the destination of the data when it is received, and when the output port corresponding to the destination of the data will be available for the data;

orienting mirrors in the chassis into a desired position with the mirror controller to create the desired reflecting path for the data so the data is reflected until the output port becomes available;

reflecting the data off of the mirrors in the chassis until an output port of the switch becomes available to the data; and sending the data out the output port onto the network.

8. A method as described in claim 7 wherein the reflecting step includes the step of amplifying the data with an optical amplifier when the data is received onto its desired reflective path.

9. A method as described in claim 8 wherein the reflecting step includes the step of refreshing the data through one of the optical amplifiers after the data has a predetermined number of reflections off of the mirrors.

10. A method as described in claim 9 wherein before the reflecting step, there are the steps of receiving the data at an optical buffer; delaying the data long enough for the mirror controller to identify the destination of the data; establishing the desired reflective path for the data in the chassis based on the destination; and transferring the data to the chassis.

11. A method as described in claim 9 wherein before the reflecting step, there is the step of establishing the desired reflective path from an advance signal about the data which the chassis receives from the network.

12. A switch for switching data from a source to a destination along a network, at least a portion of which is optically based, comprising:

a plurality of input and output ports of optical transceivers;

an element connected to the input and output ports in which the data is reflected along a desired reflective path as many times as necessary until a desired output port is available for the data to be sent out to the destination; and a mirror controller which identifies the destination of the data and establishes the desired reflective path for the data in the element from the data.

13. A switch as described in claim 12 wherein the input ports tap and decode the desired reflective path of the data from header information in the data.

14. A switch as described in claim 13 wherein the element includes a chassis having a plurality of mirrors that the data reflects off of until the output port becomes available.

15. A switch as described in claim 14 wherein each of the mirrors can be oriented into a desired position.

16. A switch as described in claim 15 including a mirror controller connected to each mirror which orients each mirror to create a desired reflective path for the data so the data is reflected until the output port becomes available.

17. A switch as described in claim 16 wherein the mirror controller keeps track of the destination of the data when it is received, and when the output port corresponding to the destination of the data will be available for the data, and determines the desired reflective path for the data from when the data is received and when the output port is available for the data.

18. A method for transferring data in a telecommunications network comprising the steps of:

receiving data at a chassis of an optical switch in the network;

identifying a desired reflective path for the data in the chassis from the data;

reflecting the data in the chassis along the desired reflective path until an output port of the switch becomes available to the data; and sending the data out the output port onto the network.

19. A method as described in claim 18 including the step of tapping and decoding the desired reflective path by an input port of the optical switch from header information in the data that the input port receives.

20. A method as described in claim 19 wherein the reflecting step includes the step of reflecting the data off of mirrors in the chassis until the output port becomes available to the data.

21. A method as described in claim 20 wherein the reflecting step includes the-step of orienting the mirrors into a desired position with a mirror controller to create a desired reflecting path for the data so the data is reflected until the output port becomes available.

22. A method as described in claim 21 wherein the reflecting step includes the step of keeping track with a mirror controller of the destination of the data when it is received, and when the output port corresponding to the destination of the data will be available for the data; and determining the desired reflective path for the data from when the data is received and when the output port is available for the data.

23. A switch for switching data from a source to a destination along a network, at least a portion of which is optically based, comprising:

a plurality of input and output ports of optical transceivers;

an element connected to the input and output ports in which the data is reflected as many times as necessary to delay the data in the element for a delay until a desired output port is available for the data to be sent out to the destination; and a mirror controller for delivering the delay for the data in the element until the output port of the switch becomes available to the data.

24. A method for transferring data in a telecommunications network comprising the steps of:

receiving data at a chassis of an optical switch in the network;

determining a delay for the data in the chassis until an output port of the switch becomes available to the data from the data;

reflecting the data in the chassis to delay the data in the chassis for the delay until an output port of the switch becomes available to the data; and sending the data out the output port onto the network.

* * * * *